Patented Aug. 14, 1934

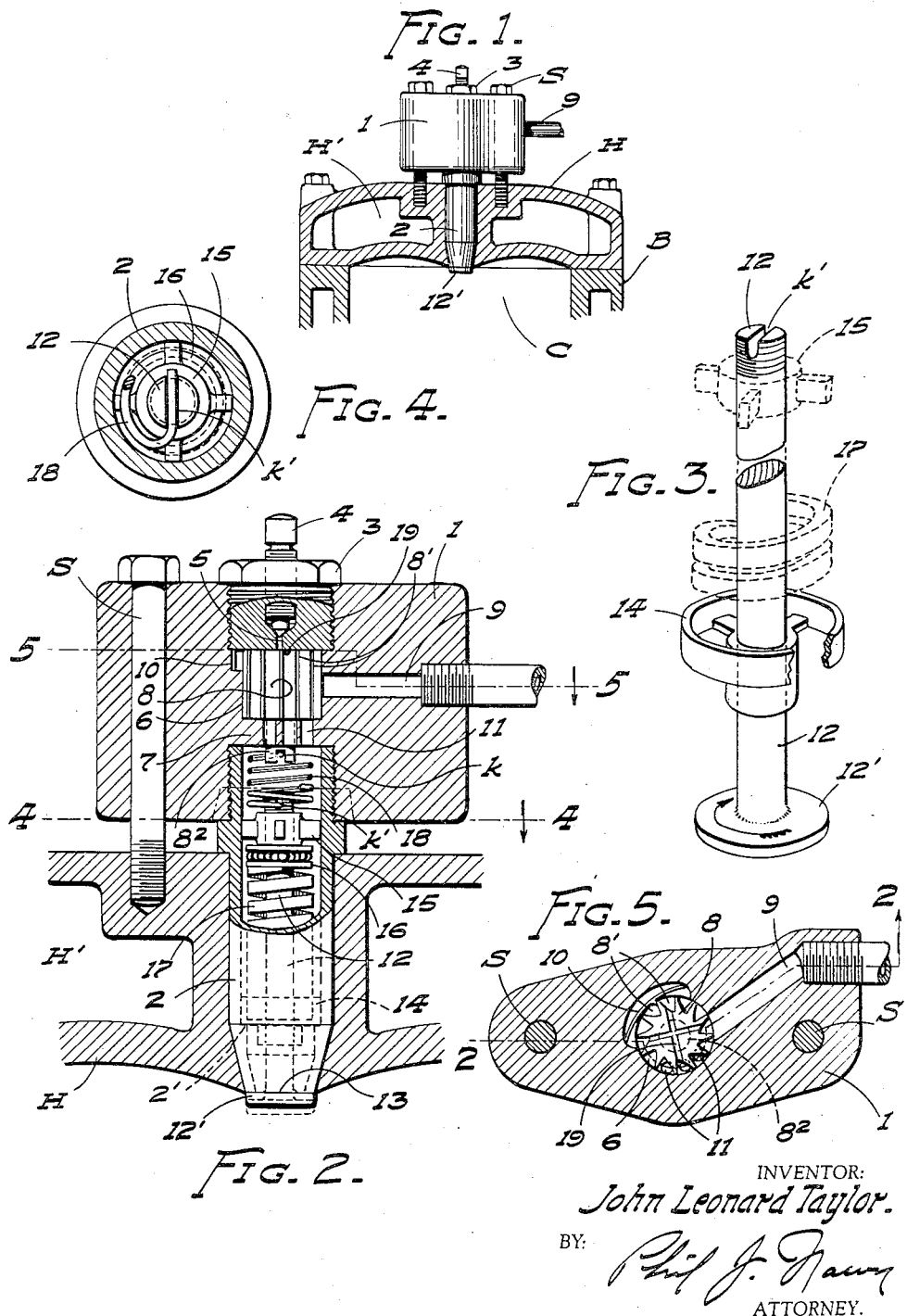

1,969,954

UNITED STATES PATENT OFFICE 1,969,954

INJECTOR VALVE

John Leonard Taylor, Kenosha, Wis.

Application August 19, 1929, Serial No. 386,977

9 Claims. (Cl. 299—133)

This invention relates to improvements in atomizing injector valves as same concern oil engines of the Diesel or similar variety wherein crude or fuel-oil or other fluid is combined with compressed air to form the explosive medium.

An object of the invention is to generally improve the construction and operation of apparatus of this type.

A further object is to provide such a device which will be substantially self cleaning, and which will tend to remain permanently tight.

A further object is to provide such a device including a valve element which is provided with means for rotating it at times when it is unseated.

A further object is to provide such a device in which the rotating means is actuated by the fluid under pressure on its way to the valve element, and in which the connection between the rotating means and the valve element is torsionally resilient, and in which said connection provides limited freedom of movement between the valve element and its rotating means in addition to that provided by virtue of its resiliency, to avoid the necessity for exact alignment of the parts relatively to each other.

Further objects and advantages will be apparent from the following specification, which, however, is illustrative merely, the invention described therein not being limited by anything in this specification, or in fact in any manner except as defined in the annexed claims.

The advantages and objects above mentioned are attained through structure illustrated in the accompanying drawing, wherein:—

Fig. 1 is a sectional view showing the invention as same is affixed to a motor.

Fig. 2 is a section on line 2—2 of Fig. 5.

Fig. 3 is a fragmentary perspective of certain parts.

Fig. 4 is a section on line 4—4 of Fig. 2.

Fig. 5 is a section on line 5—5 of Fig. 2.

Similar characters of references apply to like parts throughout the several views.

Referring to the drawing, a motor block B, having cylinders C, is provided with the cylinder-head H wherein occurs a portion of the water-cooling system H'. The top surface of the head H, especially in the Diesel-engine type of motor, ordinarily carries mechanism essential to the operation of the engine so that there is little room for providing easy accessibility to certain parts, which fact, in this instance, affects the mounting of the injection valve assemblies on the head H.

Due to conditions of the kind just recited the present invention provides a base block 1 which can be located transversely of the motor's longitudinal center and appropriately fastened to the cylinder head H by bolts S. The block 1 is purposely proportioned and intentionally fastened in a manner necessary in view of a crowded area, not shown, which restricts choice in the placement or fastening of the said block. The block 1 is oppositely bored to receive a depending tubular housing 2, and a vent plug 3, the latter provided with a needle-valve set-screw 4 which selectively seals an axial port 5 in said plug. The functions of these latter elements will be referred to later on. Between the aforesaid bores is arranged a cylindrical chamber 6 separated from the housing 2 by a wall 7. The said chamber's diameter and length is coincident to a rotor wheel 8 of the noria type, having flutes or buckets formed across its periphery. A fuel supply duct 9 extends from the chamber 6 to an appropriate connection leading to a fuel-oil pump, not shown but understood in this art as a source of intermittent fluid pressure required in the power units here considered. The duct 9 is tangentially disposed to the buckets 8' of the rotor 8. When exposed to a fluid pressure coursing through the duct 9, the said rotor will operate in a clockwise direction as seen in Fig. 5, a pawl element 10 substantially opposite duct 9 engaging the flutes of the rotor to prevent rotation thereof in a reverse direction. Fluid after impinging upon the rotor passes on through a plurality of discharge ducts or ports 11 to a space about a valve stem 12 having a head portion 12' seating exteriorly against a seat 13 on portion 2. The flutes 8' and discharge ports 11 being, individually, of less capacity than the volume of fuel-oil passed per valve operation, compels the rotor 8 to revolve appreciably at each fuel replenishing period in order to pass the requisite volume of fluid delivered to the valve. By the term "passed" as used in the claims, I mean that the oil is caused to flow. The rotor 8 is practically journaled in the chamber 6 and again centered therein by an integral trunnion $8^2$ which is journaled in the wall 7, projecting therethrough to dispose its end, having a cross-slot $k$, within the housing 2. This wall is also perforated by ports 11 through which is continued the flow of liquid fuel charging the tubular housing 2.

Within the housing 2 is assembled a reciprocating valve-stem actuating means, which resiliently functions to close a valve discharge orifice while wiping the circular brim thereof and also for allowing the said valve to open under a fuel-oil pressure which latter exceeds the resilient opposition within the housing. In both movements, opening and closing, a closure stem 12 is purposely rotated so that its disc 12' will clear the orifice brim 13 of oil residue or other material by a wiping or lapping action. This action is attained through the following means:

The valve-stem 12 is axially reciprocable in the said housing under the influence of fluid pressure, in opposition to a resilient element. An internal shoulder 2' supports a stem-centering spider or guide 14 while a similar but slidable spider-nut 15 is fixed on to the free end of the stem 12, which end is provided with a cross-slot $k$. A thrust bearing 16 abuts the under side of the nut 15, and between said bearing and the aforesaid spider 14 is disposed a stem-enveloping compression spring 17. The aforesaid spring 17 functions to seat the stem-head 12' at 13 in opposition to the fluid pressure which latter, during the period of fuel discharge forces the headed stem outwardly while the bearing 16 permits a rotation of said stem to occur by virtue of a coupling means to be presently set forth. The gap between said stem and trunnion is provided with an intervening helical torsionally resilient spring 18 whose terminals are shaped to register with the trunnion and stem slots $k$ and $k'$ and form, in this way, an operatively connecting means which provides a flexible coupling for allowing the rotative impulses of the rotor 8 to effect through a winding action which stores up torque, a subsequent revolving movement of the stem and sliding nut assembly 12—15 that is permitted by virtue of the anti-friction means 16. The fluid flow force being vertical through the housing 2 the said force may have a tendency to minimize rotation of the parts 12—15 during their outward reciprocation, however, the rotation of 8 being a positive movement the spring 18 will absorb this movement as stored torque which expends itself when the rotary-resisting force subsides in the housing after each fuel discharge through the discharge orifice. This particular time is the period when the head 12' returns to seat the said orifice and the remaining torsional force left in spring 18 serves to affect the head 12' to resume its seat through an ascending spiral movement terminating with a short rotative movement in the horizontal plane of the orifice brim which latter is a flat circular surface in the present instance although various angular arrangements of the surface are contemplated as within the scope of the invention. This action allows the said head to grind its way through any lingering particles of carbon, fuel, impurities, or the like adhering to said brim, the head wiping the brim aforesaid progressively around the circle thereof, due to the rotation of head 12'.

The elements 15, 16, 17 and 18 are physically such that intense temperatures would seriously affect their responsiveness. However, the present arrangement permits the disposing of these elements entirely within or closely adjacent the water-jacket compartment H' of the head H, thereby maintaining a temperature about said elements which will conserve their operative efficiency and tenure of service.

In apparatus of the present type there is likelihood of a certain amount of air or other gas finding its way into the system and causing unreliable operation or other difficulties. In the present instance, since the housing 2 and the chamber 6 are connected by ports 11, any such entrapped gas may rise to the uppermost part of the assembly, passing through the ports 11, and between the buckets 8' to the uppermost part of the rotor chamber 6, whence it finds its way either through the normal running clearance between the rotor 8' and plug 3, or through surface grooves 19 on the upper face of rotor 8, or through other suitable passages to port 5 from which it may be allowed to escape when necessary by unseating needle valve 4. The location of this valve at the top of the base block 1 brings it within easy reach in spite of the complication of mechanism usually found on the head of an engine of this type, and also positions it at substantially the nearest point to the actual spray orifice at which the trapped gas would normally accumulate.

The above being a complete description of an illustrative embodiment of the invention, what is claimed as new and desired to be secured by Letters Patent of the United States is:—

1. An injector valve having, a fluid impelled rotary member journaled within a base block, a valve closure stem resiliently responsive to the force that rotates said member to simultaneously allow expulsion of a portion of the fluid medium supplied by said valve, and a torque absorbing element having extensible properties coupling togther said member and said stem.

2. An injector valve having, a base block, a noria wheel element journaled in a chamber within said block, a fluid duct in said block tangentially joining said chamber, ratchet means restricting said wheel to perform in consonance with the tangent influence of fluid flow on said wheel, a torque storing element aided by said ratchet means and valve-orifice closure means rotatively influenced by said wheel through said element simultaneously with the development of a fluid pressure in fluid introduced through said duct for projecting said closure means to open the discharge orifice of the aforesaid valve.

3. An injector valve having, a closed chamber, a spring urged closure stem, a fluid passage including said chamber for liquid under pressure, a rotatable member peripherally fluted functioning as a fluid dispensing barrier in said chamber and arranged to rotate therein under the fluid flow it admits, said member connected to said stem by a helical sinuous link, said link being arranged as a coupling for rotating said stem.

4. An injector valve having, a base block journaling an intermittently actuated rotor impulsed by a fluid flow passed through said valve by said rotor for indirectly oscillating a valve closure means, said means spacedly separated from said rotor by a helical element arranged to function as a winding key, said rotor and said means slotted to receive the ends of said element for allowing the winding of said closure means in one direction under the urging of the aforesaid rotor in order to attain the opposite rotation of said means after the unseating of said closure means.

5. An injector valve having, a housing inclosing a rotor ratcheted to rotate progressively, a reciprocable and rotatable rod providing a valve closure disc outside said housing and a centering spider inside said housing, an anti-friction bearing beneath said spider, a compression spring about said rod, said spring arranged to shoulder in said housing and under said bearing, and a helical coupling element intermediate the said rotor and said rod, said element arranged as an extensible and collapsible key for transmitting the rotor's impulses and rotating the aforesaid rod during the reciprocative movements of said rod.

6. An injector valve having, a divided fluid flow passage provided with a rotatable fluid barrier, said barrier being formed to rotate under the flow force of fluid passed through said valve, a reciprocable and rotatable valve closure means, a torsionally yieldable resilient element coupling together said barrier and said means, said barrier operating under the fluid flow force to rotate said means and admit fluid force to depress said means, and an independent resilient element yieldingly opposing depressing of said means said means and said element related to produce a discharge orifice-wiping action in said means after the fluid flow ceases.

7. In an injector valve the combination of a valve body provided with a valve seat, a valve member within said body and rotatively and reciprocatively movable therein, means for rotating said stem including a fluid impelled rotor journaled in said valve body, and torsionally resilient coupling means connected between said rotor and said valve member.

8. In an injector valve the combination of a valve body provided with a valve seat, a valve member of substantial mass within said body and rotatively and reciprocatively movable therein, means for seating and unseating said valve means, a fluid impelled rotor journaled in said valve body, torsionally resilient energy storing coupling means connected between said rotor and said valve member, a ratchet arranged to prevent rotation of said rotor in a reverse direction upon reduction of the rotative force of the fluid upon opening of said valve means, whereby said valve may oscillate when freed from said seat owing to the cooperation of its inertia with the torsionally resilient coupling means.

9. In an injection valve the combination of a valve body having a fluid passage therethrough leading to a valve seat, a valve member formed to cooperate with said seat and so arranged as to be moved away from said seat by fluid pressure in said passage, said valve member being also rotatable in said valve body and so formd as to provide an injection orifice directly between said seat and said member, and means for rotating said valve member including a fluid impelled rotor journaled in said valve body, and a torsionally resilient connecting member arranged to rotate said valve member from movement of said rotor.

JOHN LEONARD TAYLOR.